(12) United States Patent
Hoerner et al.

(10) Patent No.: US 6,497,484 B1
(45) Date of Patent: Dec. 24, 2002

(54) OPTICAL IMAGING APPARATUS

(75) Inventors: Gary Hoerner, Highland Ranch, CO (US); Michael Levin, Ojai, CA (US)

(73) Assignee: Holo-Gone, LLC, Ojai, CA (US)

( * ) Notice: Subject to any disclaimer, the term of this patent is extended or adjusted under 35 U.S.C. 154(b) by 0 days.

(21) Appl. No.: 09/623,360

(22) PCT Filed: Apr. 15, 1999

(86) PCT No.: PCT/US99/08293

§ 371 (c)(1),
(2), (4) Date: Aug. 31, 2000

(87) PCT Pub. No.: WO99/53346

PCT Pub. Date: Oct. 21, 1999

Related U.S. Application Data

(60) Provisional application No. 60/081,860, filed on Apr. 15, 1998.

(51) Int. Cl.[7] ................................................. G03B 21/20
(52) U.S. Cl. .......................................... 353/10; 359/479
(58) Field of Search ............................... 353/7, 10, 28, 353/74, 77, 78; 359/478, 479

(56) References Cited

U.S. PATENT DOCUMENTS

| | | |
|---|---|---|
| 2,576,147 A | 11/1951 | Sauvage |
| 4,261,657 A | 4/1981 | Reiback |
| 4,802,750 A | 2/1989 | Welck |
| 5,257,130 A | 10/1993 | Monroe |
| 5,311,357 A | 5/1994 | Summer et al. |

*Primary Examiner*—William Dowling
(74) *Attorney, Agent, or Firm*—Timothy J. Martin; Michael R. Henson; Rebecca A. Gegick

(57) ABSTRACT

An image projecting apparatus is provided to project a real image of an object to be displayed while obscuring the object from view by an observer located exteriorly of the image projecting apparatus. The apparatus includes a housing (12) having an interior and a view area (14) for the real image. First and second reflective surfaces (40, 50), such as mirrors, are disposed in the housing. The first reflective surf (40) must be concave of a variety of geometric shapes. The second reflective surface (50) may be concave or, alternatively, planar. A masking member is interposed between the object and the view area. The second reflective surface can define the masking member. The first and second reflective surfaces are arranged at an acute angle to each other.

19 Claims, 2 Drawing Sheets

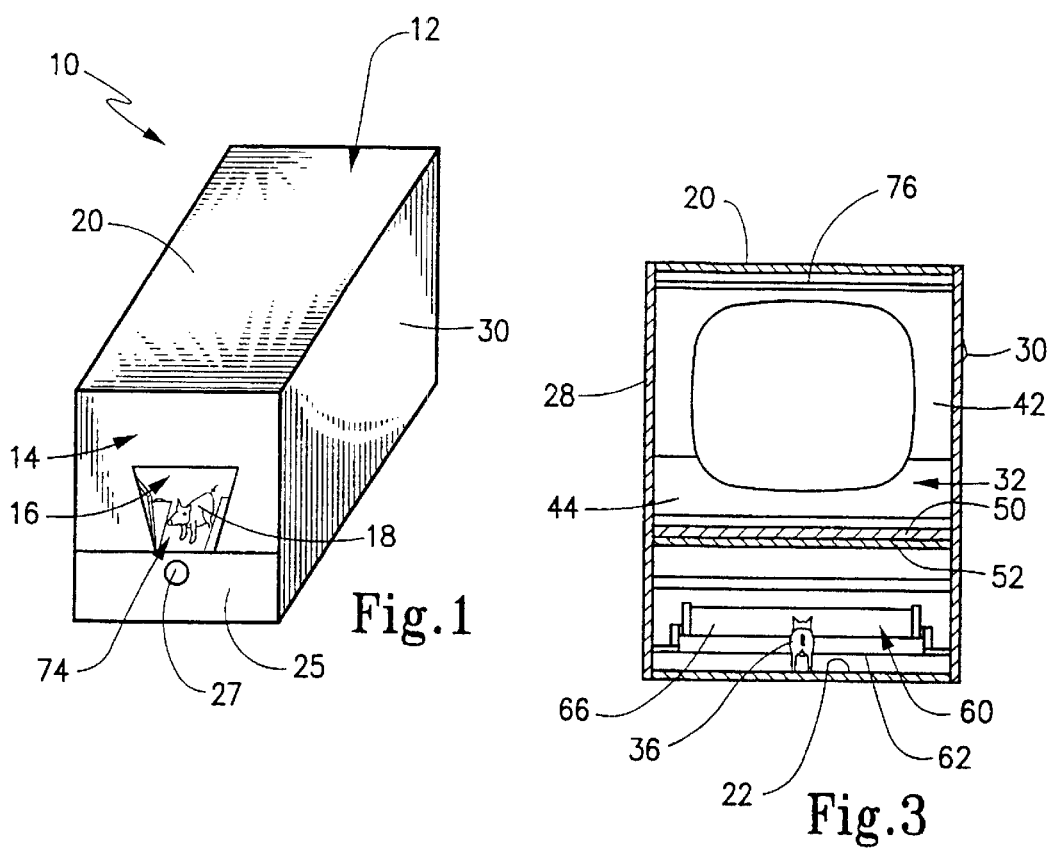
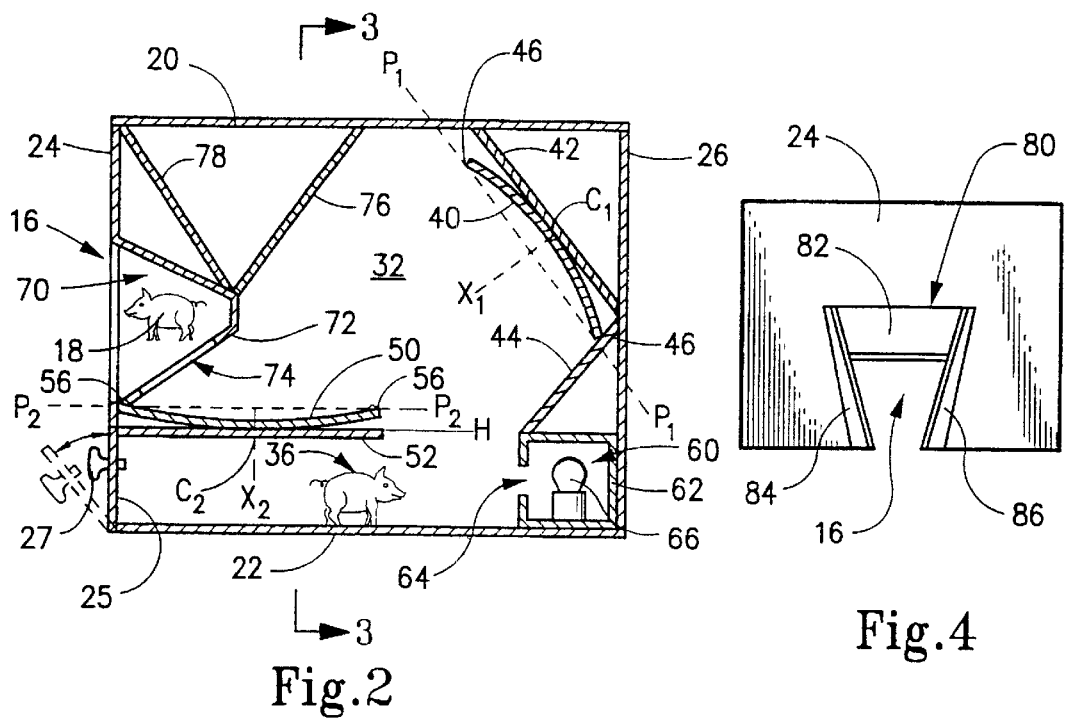

OPTICAL IMAGING APPARATUS

RELATED APPLICATION

This application claims the benefit of U.S. Provisional Application No. 60/081,860 filed Apr. 15, 1998.

FIELD OF INVENTION

This invention broadly relates to optical imaging. More particularly, however, the present invention concerns an optical display apparatus that may be employed to create a real image in space which real image may be viewed by an observer. The present invention particularly concerns an apparatus that produces a real image of an object but that prevents view of the object itself.

BACKGROUND OF THE INVENTION

A variety of devices have been used in past to create images in space. In such devices, a variety of mirrors have been used to project an image of object so it appears that the object is at a location where it is not. Naturally, such devices can be used to present dramatic advertising effects.

An example of such an optical display device is shown is U.S. Pat. No. 5,111,357 issued May 10, 1994 to Summer et al. In the '357 patent, a pair of concave mirrors are placed in a clam-shell configuration, so that the virtual image created by one mirror is reflected by the other mirror to create a real image that projects at least partially out of a view opening. In another embodiment of this invention, two mirrors are parallel to one another but are staggered to create the same effect.

In U.S. Pat. No. 4,802,750 issued Feb. 7, 1989 to Welck, a real image projection system again employs a clam-shell configuration of two facing curvilinear mirrors. Alternatively, one of the mirrors can be replaced by a reflective surface that creates a reflection of the other mirror to provide a curvilinear virtual reflective expanse. Each mirror has its vertex coincident with the focal point of the other mirror.

The disadvantage of the prior art optical imaging devices resides in the location of the object relative to the viewing opening. Typically, the object must be placed between the median planes of the mirrors (as defined by the planes containing their respective peripheral edges) or otherwise projected to a location between the median planes between the mirrors. In so doing, it is possible for an observer located exteriorly of the projection system to see the actual object through the view opening. This detracts from the overall appearance and effectiveness of the display.

SUMMARY OF THE INVENTION

It is an object of the present invention to provide an improved optical imaging apparatus where in an image of an object is projected either in or through a viewing area while at the same time the object itself is masked from view.

It is another object of the present invention to provide an improved optical system that enhances the clarity of a real image projected from an object.

According to the present invention, then, an image projecting apparatus whereby an observer located exteriorly of the image projecting apparatus can see an image of an object placed therein. Broadly, the imaging projecting apparatus according to the present invention includes a housing that defines an enclosure. The housing has an interior and an object support area that is adapted to receive an object to be displayed. The housing has a front portion having a view region viewable by an observer located exteriorly of the housing.

A concave first reflective surface is disposed in the housing and is oriented to receive light from the object and is operative to produce a virtual image of the object when the object is placed on this object support area. A second reflective surface is also disposed in the housing. The second reflective surface is oriented to reflect the virtual image produced by the first reflective surface as a real image of the object. The second reflective surface projects the real image into the view area. A masking member is also disposed in the housing and is interposed between the object support area of the view region such that the object cannot be viewed directly through the view region by the observer.

The first reflective surface defines a curvilinear surface area that can be selected from a group consisting of spiracle surfaces, parabolic surfaces, cylindrical surfaces and double cylindrical surfaces. Preferably, these reflective surfaces are sections of geometric shells of geometric shapes described above. The second reflective surface can take any of these same shapes but can also be a planar reflective surface, i.e., a planar mirror.

In the preferred invention, a light source is disposed in the interior of the housing and is located to illuminate an object placed on the object support area. To this end, also, a baffle panel may be disposed in the housing and positioned to prevent direct view of the light source by the observer. An opaque shroud may be employed and may be disposed in the interior of the housing to surround the view region in order to isolate the view region from that portion of the housing interior located outside of the housing. The shroud has an opening oriented such that the real image is projected through the opening and into the view region.

The masking member may be a suitable sized and positioned panel or, alternatively, may be defined by the second reflective surface. In order to allow the displayed object to be changed, an access panel is provided to the housing interior with this access panel being movable between open and closed position.

Preferably, the first reflective surface has a first peripheral edge, a first median plane containing the first peripheral edge and a center. Likewise, the second reflective surface has a second peripheral edge, a second median plane containing the second peripheral edge and a center. The first median plane is preferably oriented at an acute angle with respect to the second median plane, with this angle being in a range of about 25° to 80°, inclusive. The center of the first reflective surface is offset rearwardly of the center of the second reflective surface, and a portion of the first reflective surface is preferably rearwardly offset from a rear portion of the second peripheral edge. The object support area is located within a geometric projection of the second peripheral edge and behind the second reflective surface.

Preferably, the image projecting apparatus is adapted to be supported on a support surface. The housing is such that the second median plane may be oriented at an angle of 0° to 20° with respect to a horizontal plane with the first and second reflective surfaces being suitably supported by the housing for their relative orientation to the horizontal plane and to each other. Thus, the first and second median planes are preferably oriented at an angle of about 25° to 40° with respect to one another. With this configuration, the first reflective surface is located at the back of the housing and reflects light forwardly and downwardly therein while the second mirror is located forwardly in the housing and reflects light from the first mirror upwardly and forwardly into the view.

These and other objects of the present invention will become more readily appreciated and understood from a consideration of the following detailed description of the exemplary embodiment(s) when taken together with the accompanying drawings, in which:

BRIEF DESCRIPTION OF DRAWINGS

FIG. 1 is a perspective view of a optical imaging apparatus according to the present invention;

FIG. 2 is side view in cross section of the optical imaging apparatus of FIG. 1;

FIG. 3 is a cross-sectional view taken about lines 3—3 of FIG. 2;

FIG. 4 is a rear view in elevation of the front panel and shroud according to the present invention;

DETAILED DESCRIPTION OF THE EXEMPLARY EMBODIMENTS

Figure 5:
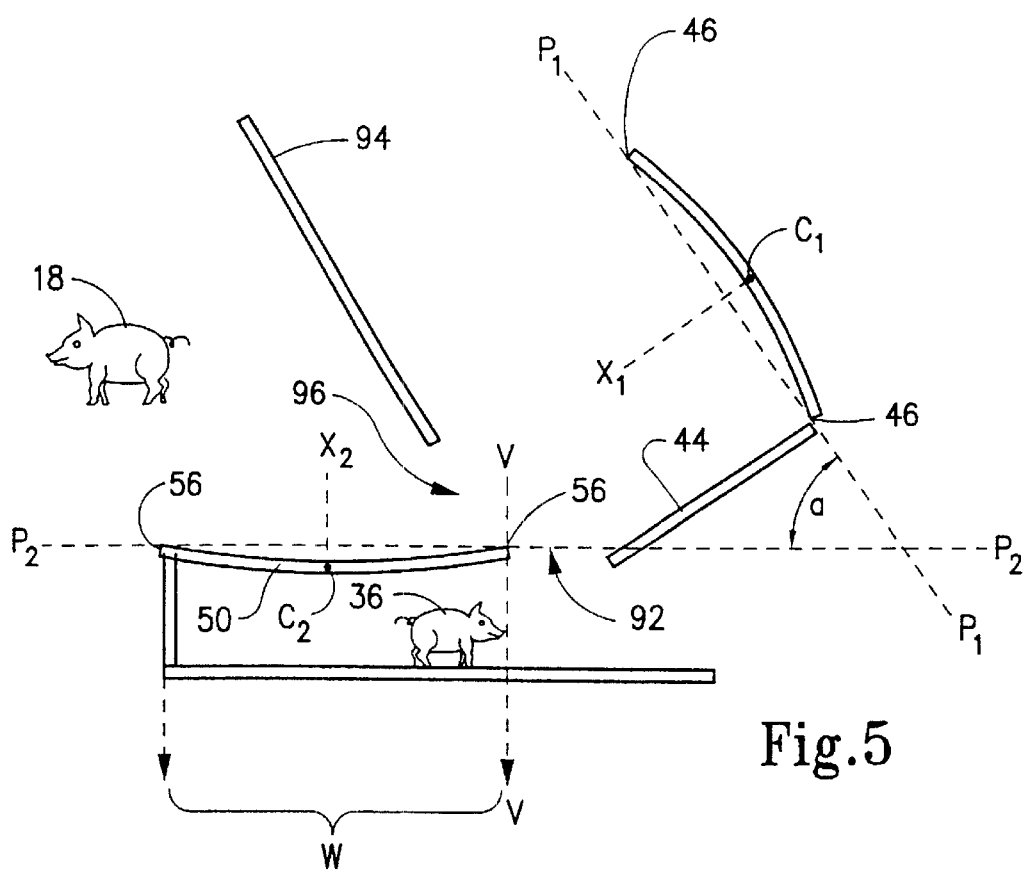
FIG. 5 is a diagrammatic view of the optical system according to the present invention.

The present invention is directed to optical imaging system that used to project a real image of an object either in a viewing area or through a viewing area in such a manner that the object itself is not viewable by an observer. This invention is thus useful for advertising, as a novelty or such other applications where it is desired that the image of an object be viewable while the object is either masked or kept in a secured state.

Thus, as shown in FIG. 1, optical imaging apparatus 10 is in the form of a housing 12 having a front 14 that includes a viewing area or "view region" in the vicinity of window 16 wherein in a real image 18 of an object may be seen by an observer. Housing 12 may be any convenient support structure that is effective to support the optical imaging elements relative to a support surface. Preferably, housing 12 is an enclosure, but it should be understood that this invention contemplates other support structures as would be apparent to the ordinarily skilled designer.

For example, as shown in FIGS. 1 through 4, an exemplary housing 12 has a box-like construction having a top wall 20, a bottom wall 22, a front wall 24, a rear wall 26 and a pair of side walls 28 and 30. With reference again to FIG. 1, it may be seen that viewing window 16 is formed through front wall 24. A selected object 36, which in this illustrative case is a small model of farm animal, is positioned in the interior 32 of housing 12 at a location that may be referred to as the "object support area".

In order to allow a user to select and to place different objects in the object support area, an access panel, such as panel 25, is conveniently provided in housing 12. Access panel 25 can move from a closed position shown in FIG. 2 that restricts access to the object 36 to an open position (shown in phantom) that allows access to the object to be displayed. This allows different objects to be easily inserted into and removed from the interior 32 of housing 12.

A first reflective surface in the form of a first mirror 40 is disposed in interior 32 and is oriented so that light from object 36 may be reflected thereby, thus creating a virtual image (not shown). First mirror 40 is held in position by a support 42. A baffle panel 44 extends transversely between sidewalls 28 and 30. It is important for the operation of optical imaging apparatus 10 that first mirror 40 be concave. To this end, mirror 40 may be formed as a section of a spherical surface, a parabolic surface, a cylindrical surface or a double cylindrical surface.

In any event, first mirror 40 has a first center $C_1$ and median plane $P_1$ containing its peripheral edge 46. First mirror 40 has an axis $X_1$ that is perpendicular to plane $P_1$ and that passes through $C_1$. In this exemplary embodiment, first mirror 40 is an off axis section of a parabolic mirror having a focal length of about 8.25 cm (3.25 inches). First mirror 40 is located at the rear of housing 12 and reflects light from object 36 forwardly and downwardly in the interior 32.

A second reflective surface in the form of a second mirror 50 is also disposed in interior 32 of housing 12. As is shown in FIG. 2, second mirror 50 is supported on a platform 52 and has a median plane $P_2$ containing its peripheral edge 56. Second mirror 50 has a second center $C_2$ and an axis $X_2$ that is perpendicular to plane $P_2$ and that passes through $C_2$.

Mirror 50 may be flat, if desired. However, it is also possible to construct mirror 50 as a portion of a spherical surface, a parabolic surface, a cylindrical surface or a double cylindrical surface. Each of these curvatures have different advantages of distortion, magnification, angle of view and portion of the real image. The flatter mirror 50 is, the larger magnification of the real image 18. More curvature, however, allows smaller dimensioning of housing 12. In this exemplary embodiment, second mirror 50 is a section of a spherical mirror having a 5× power.

In this exemplary embodiment, plane $P_2$ is oriented parallel to a horizontal plane "H" and parallel to bottom wall 22. Bottom wall 22 acts as a support for object 36 on a flat support surface, although it should be understood that any appropriate structure could be used to support the object in the object support area. Second mirror 50 is located to reflect light from first mirror 40 forwardly and upwardly toward view window 16. Moreover, $C_1$ of first mirror 40 is rearwardly offset from $C_2$ of second mirror 50 with at least a portion of mirror 40 being rearwardly offset from the rear edge portion of the second peripheral edge 56.

Depending on the type and curvature of first mirror 40, the median plane of second mirror 50 may be tilted at an acute angle up to including about 200 with respect plane "H" and bottom wall 22. In such case, the median plane would slope downwardly into the interior 32. First mirror 40, on the other hand, has its median plane oriented at an acute angle with respect to bottom wall 22 and the horizontal. Again, depending on the type of mirror and it's physical size and curvature, the median plane $P_1$ of mirror 40 may be tilted between an angle of between about 25° to 80° with respect to bottom wall 22.

The object to be displayed may be luminescent, but more often the object will need to be illuminated. To facilitate the lighting of object 36, a light source 60 is disposed in a reflective housing 62 adjacent bottom wall 22 and rear wall 26. Reflective housing 62 has an opening 64 so that light from bulb 66 may be incident onto object 36. A baffle panel 44 is disposed in interior 32 and is positioned such that the light source (bulb 66) cannot be viewed directly through the window 16 by the observer located exteriorly of optical imaging apparatus 10.

Window 16 is formed as an opening to a viewing region or view box 70 that includes a lower panel 72 having an opening 74 centrally located therein. Panel 72 extends transversely between side walls 28 and 30 and is upwardly sloping from front wall 24 towards the interior 32 of housing 12. A shroud 80 is formed by panel 72, downwardly sloping top panel 82 and a pair of side panels 84 and 86. Each of side panels 84 and 86 has bottom edge that is configured to abut lower panel 72. Shroud 80 is supported by braces 76 and 78 that extend transversely between side walls 28 and 30. Braces 76 and 78 also rigidify housing 12. Shroud 80 thus provides an opaque barrier surrounding the view region in order to isolate the view region from the rest of the interior 32 except for light entering the view region through opening 74.

As noted above, first mirror 40 creates a virtual image of object 36 which virtual image is then reflected by second mirror 50. This real image is projected through opening 74 so that real image 18 appears in the interior of view box 70 so that it is in the view region to be seen through view window 16. It is important for this invention that the object 36 should not be viewable through the window 16 or viewing region by an observer located exteriorly of the image projecting apparatus. Accordingly, a masking member is disposed in the housing 12 and is interposed between the object support area and the view region. In the exemplary embodiment, the object 36 is located below plane "H", and, with reference to FIG. 2, it may be seen that object 36 is actually located behind mirror 50 and cannot be seen by an observer through opening 74. Mirror 50 therefore defines the masking member although other suitable structures, including baffle panels or platform 52, are within the scope of this invention. It may also be noted that real image 18 reverses the front to back appearance of object 36.

With reference, now, to FIG. 5, the general optical geometry of the present invention is shown in greater detail. As is shown in this diagrammatic view, first mirror 40 has a median plane "$P_1$" which is the plane that includes the peripheral edge of 46 thereof. Similar, second mirror 50 has a median plane "$P_2$" that includes peripheral edge 56. Mirror 40 has a optical axis "$X_1$" that is perpendicular to plane $P_1$ while second mirror 50 has an optical axis $X_2$ that is perpendicular to plane $P_2$. It should be understood that optical axis' $X_1$ and $X_2$ are preferably in a common plane that includes the center of opening 74, although it is possible that mirrors 40 and 50 could have their optical axes canted with respect to one another. In any event, it is preferred that plane $P_1$ be oriented at an acute angle "a" to plane $P_2$. Preferably this angle is approximately a 60 degrees, although, as noted above, angle "a" can be anywhere within a range of about 25 to 80 degrees.

Center $C_1$ of first mirror 40 is rearwardly offset from center $C_2$ of second mirror 50 so that object 36 may be placed below plane $P_2$ and preferably within a geometric projection "W" of mirror 50 in a direction perpendicular to its median plane $P_2$, that is, behind mirror 50. At the same time, first mirror 40 must be positioned so as to receive light from object 36 to create the virtual image for mirror 50. Accordingly, mirror 40 must include a portion that is rearwardly offset from vertical plane "V" that is perpendicular to plane $P_2$ and which includes rear edge 56 prime of mirror 50. Baffle panel 44 creates a narrow slit 92 so that object 36 is further hidden from direct view by the observer and to screen light from light source 60 thus diffusing the light in interior 32. Shroud panel 94 may be optionally provided for these purposes, as well as is shown shroud panel 94 creates a slit 96 with mirror 50.

Figure 6:
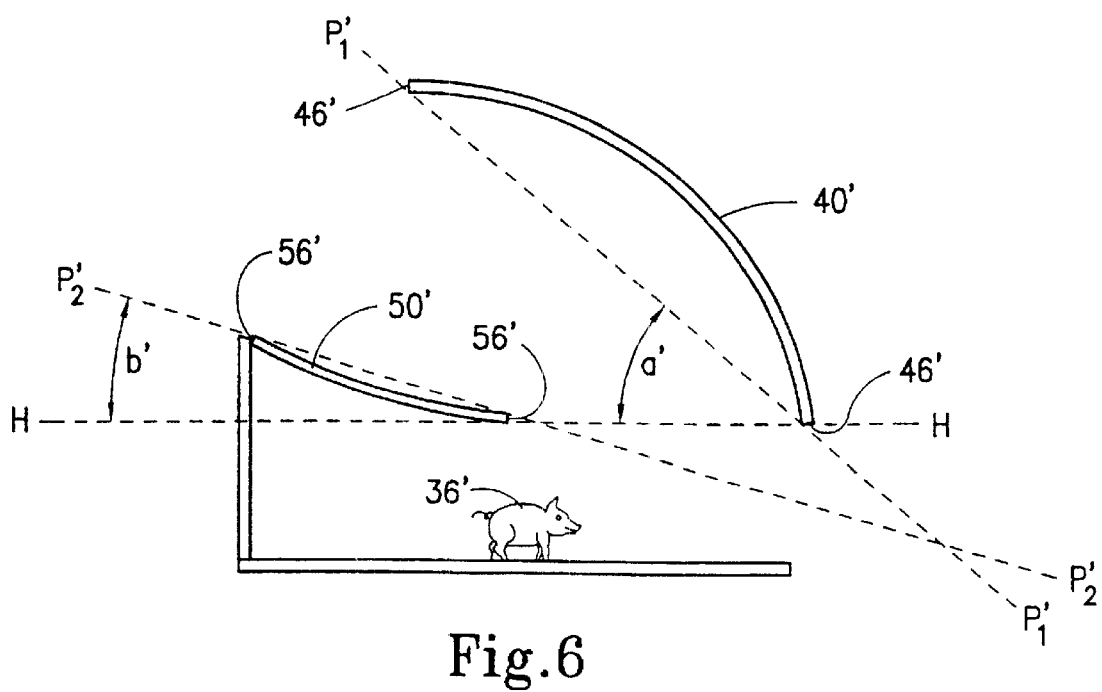
FIG. 6 is a diagrammatic view of an alternative mirror arrangement for the present invention.

Turning finally to FIG. 6, an alternative arrangement of the mirrors is shown. Here, mirror 50' is shown to have its median plane $P_2$, tilted at an angle "b" that is in a range of about 11° to 15° to the horizontal plane "H". Object 36' is located behind plane $P_2$, but is not behind mirror 50'. Mirror 50' may be flat, if desired. However, it is also possible to construct mirror 50' as a portion of a spherical surface, a parabolic surface, a cylindrical surface or a double cylindrical surface. Each of these curvatures have different advantages of distortion, magnification, angle of view and portion of the real image. When mirror 50 is flatter, a larger magnification of the real image 18 occurs. More curvature, however, allows smaller dimensioning of housing 12.

Also, mirror 40' is enlarged and includes a portion that projects forwardly of object 36'. Mirror 40' has its median plane $P'_1$ oriented as an angle a' that is in a range of about 40°–50° with respect to horizontal plane H. Surprisingly, this orientation allows an almost 360° view of object 36' to be projected by the optical system. Here, it is preferred that mirror 40' by constructed as a portion of a spherical surface.

Accordingly, the present invention has been described with some degree of particularity directed to the exemplary embodiment(s) of the present invention. It should be appreciated, though, that the present invention is defined by the following claims construed in light of the prior art so that modifications or changes may be made to the exemplary embodiment(s) of the present invention without departing from the inventive concepts contained herein.

We claim:

1. An image projecting apparatus adapted to display an image of an object whereby an observer can see the image, comprising:
    (a) a housing defining an enclosure and having an interior and an object support area adapted to receive an object to be displayed, said housing including a front portion having a view region viewable by an observer located exteriorly of said housing;
    (b) a concave first reflective surface disposed in said housing and oriented to receive light from the object and operative to produce a virtual image of the object when the object is placed on the object support area;
    (c) a second reflective surface disposed in said housing and oriented to reflect the virtual image produced by the first reflective surface as a real image of the object, said second reflective surface operative to project the real image into the view region; and
    (d) a masking member disposed in said housing and interposed between the object support area and the view region such that the object cannot be viewed directly through the view region by said observer.

2. An image projection apparatus according to claim 1 wherein said first reflective surface is a curvilinear surface area selected from a group consisting of spherical surfaces, parabolic surfaces, cylindrical surfaces and double cylindrical surfaces.

3. An image projection apparatus according to claim 1 wherein said second reflective surface is selected from a group consisting of a planar surface section, spherical surface sections, parabolic surface sections, cylindrical surface sections and double cylindrical surface sections.

4. An image projection apparatus according to claim 1 including a light source disposed in the interior of said housing and located to illuminate the object placed on the object support area.

5. An image projection apparatus according to claim 4 including a baffle panel disposed in said housing and positioned such that said light source cannot be viewed directly through the view region by said observer.

6. An image projection apparatus according to claim 1 wherein said first reflective surface has a first peripheral edge, a first median plane containing the first peripheral edge and a center, wherein said second reflective surface has a second peripheral edge, a second median plane containing the second peripheral edge and a center, and wherein the first median plane is oriented at an acute angle with respect to the second median plane.

7. An image projection apparatus according to claim 6 wherein the acute angle is within a range of about 25° and 80°, inclusive.

8. An image projection apparatus according to claim 6 wherein said acute angle is about 60°.

9. An image projection apparatus according to claim 6 wherein a portion of said first reflective surface is rearwardly offset from a rear portion of the second peripheral edge.

10. An image projecting apparatus adapted to be supported on a support surface and operative to a support to display an image of an object whereby an observer can see the image, comprising:
(a) a housing defining an enclosure and having an interior and an object support area adapted to receive an object to be displayed, said housing including a front portion having a view region viewable by an observer located exteriorly of said housing;
(b) a concave first mirror disposed in said housing and having a first peripheral edge, a first median plane containing the first peripheral edge and a center, said first mirror oriented to receive light from the object and operative to produce a virtual image of the object when the object is placed on the object support area;
(c) a second mirror disposed in said housing and having a second peripheral edge, a second median plane containing the second peripheral edge and a center, said second mirror oriented to reflect the virtual image produced by the first reflective surface as a real image of the object, said second reflective surface operative to project the real image into the view region, said housing configured to support said first mirror such that the first median plane is oriented at an angle of 25° to 80° with respect to a horizontal plane passing through said housing and to support said second mirror such that the second median plane is oriented at an angle of 0° to 20° with respect to the horizontal plane; and
(d) a masking member disposed in said housing and interposed between the object support area and the view region such that the object cannot be viewed directly through the view region by said observer.

11. An image projection apparatus according to claim 10 wherein said first mirror is selected from a group consisting of spherical surface sections, parabolic surface sections, cylindrical surface sections and double cylindrical surface sections and wherein said second mirror is selected from a group consisting of a planar mirrors, spherical section mirrors, parabolic section mirrors, cylindrical section mirrors and double cylindrical section mirrors.

12. An image projection apparatus according to claim 10 wherein said first and second median planes are oriented at an angle of about 25° to 40° with respect to one another.

13. An image projection apparatus according to claim 10 wherein said housing has a back, a bottom and a top, and wherein said first mirror is located at the back of said housing and reflects light forwardly and downwardly therein and said second mirror reflects light from said first mirror upwardly and forwardly.

14. An image projecting apparatus adapted to display an image of an object whereby an observer can see the image, comprising:
(a) a housing defining an enclosure and having an interior and an object support area adapted to receive an object to be displayed, said housing including a front portion having a view region viewable by an observer located exteriorly of said housing;
(b) a concave first reflective surface disposed in said housing and oriented to receive light from the object and operative to produce a virtual image of the object when the object is placed on the object support area;
(c) a second reflective surface disposed in said housing and oriented to reflect the virtual image produced by the first reflective surface as a real image of the object, said second reflective surface operative to project the real image into the view region; and
(d) a masking member disposed in said housing and interposed between the object support area and the view region such that the object cannot be viewed directly through the view region by said observer, said masking member being defined by said second reflective surface.

15. An image projecting apparatus adapted to display an image of an object whereby an observer can see the image, comprising:
(a) a housing defining an enclosure and having an interior and an object support area adapted to receive an object to be displayed, said housing including a front portion having a view region viewable by an observer located exteriorly of said housing, and an access panel that is movable between an open position allowing access to the object support area and a closed position which restricts access to the object support area;
(b) a concave first reflective surface disposed in said housing and oriented to receive light from the object and operative to produce a virtual image of the object when the object is placed on the object support area;
(c) a second reflective surface disposed in said housing and oriented to reflect the virtual image produced by the first reflective surface as a real image of the object, said second reflective surface operative to project the real image into the view region; and
(d) a masking member disposed in said housing and interposed between the object support area and the view region such that the object cannot be viewed directly through the view region by said observer.

16. An image projecting apparatus adapted to display an image of an object whereby an observer can see the image, comprising:
(a) a housing defining an enclosure and having an interior and an object support area adapted to receive an object to be displayed, said housing including a front portion having a view region disposed at a front of said housing and viewable by an observer located exteriorly of said housing;
(b) a concave first reflective surface disposed in said housing and oriented to receive light from the object and operative to produce a virtual image of the object when the object is placed on the object support area, said first reflective surface having a first peripheral edge, a first median plane containing the first peripheral edge and a center;
(c) a second reflective surface disposed in said housing and oriented to reflect the virtual image produced by the first reflective surface as a real image of the object, said second reflective surface operative to project the real image into the view region and having a second peripheral edge, a second median plane which contains the second peripheral edge, and a center, and wherein said first median plane is oriented at an acute angle with respect to the second median plane and the center of said first reflective surface is offset rearwardly of the center of said second reflective surface; and (d) a masking member disposed in said housing and interposed between the object support area and the view region such that the object cannot be viewed directly through the view region by said observer.

17. An image projecting apparatus adapted to display an image of an object whereby an observer can see the image, comprising:

(a) a housing defining an enclosure and having an interior and an object support area adapted to receive an object to be displayed, said housing including a front portion having a view region viewable by an observer located exteriorly of said housing;

(b) a concave first reflective surface disposed in said housing and oriented to receive light from the object and operative to produce a virtual image of the object when the object is placed on the object support area, said first reflective surface having a first peripheral edge, a first median plane containing the first peripheral edge and a center;

(c) a second reflective surface disposed in said housing and oriented to reflect the virtual image produced by the first reflective surface as a real image of the object, said second reflective surface operative to project the real image into the view region and having a second peripheral edge, a second median plane which contains the second peripheral edge, and a center, and wherein said object support area is located within a geometric projection of the second peripheral edge and behind said second reflective surface; and (d) a masking member disposed in said housing and interposed between the object support area and the view region such that the object cannot be viewed directly through the view region by said observer.

18. An image projecting apparatus adapted to display an image of an object whereby an observer can see the image, comprising:

(a) a housing defining an enclosure and having an interior and an object support area adapted to receive an object to be displayed, said housing including a front portion having a view region viewable by an observer located exteriorly of said housing;

(b) an opaque shroud disposed in the interior of said housing to surround the view region and operative to isolate the view region from that portion of the interior located outside of said shroud, said shroud having an opening oriented such that the real image is projected therethrough and into the view region;

(c) a concave first reflective surface disposed in said housing and oriented to receive light from the object and operative to produce a virtual image of the object when the object is placed on the object support area;

(d) a second reflective surface disposed in said housing and oriented to reflect the virtual image produced by the first reflective surface as a real image of the object, said second reflective surface operative to project the real image into the view region; and (e) a masking member disposed in said housing and interposed between the object support area and the view region such that the object cannot be viewed directly through the view region by said observer.

19. An image projecting apparatus according to claim 1 wherein said masking member extends rearwardly from the front portion into the interior.

\* \* \* \* \*

UNITED STATES PATENT AND TRADEMARK OFFICE
CERTIFICATE OF CORRECTION

PATENT NO.    : 6,497,484 B1
DATED         : December 24, 2002
INVENTOR(S)   : Hoerner et al.

It is certified that error appears in the above-identified patent and that said Letters Patent is hereby corrected as shown below:

<u>Column 4,</u>
Line 41, "including about 200," should read -- including about 20º --.

Signed and Sealed this

Sixth Day of May, 2003

JAMES E. ROGAN
*Director of the United States Patent and Trademark Office*